United States Patent
Salyzyn

(10) Patent No.: US 7,277,899 B1
(45) Date of Patent: Oct. 2, 2007

(54) METHOD AND COMPUTER PROGRAM FOR REDUCING STORAGE SPACE REQUIREMENTS IN A FILE SYSTEM COMPRISING LINKABLE FILES

(75) Inventor: Mark Gregory Salyzyn, Maitland, FL (US)

(73) Assignee: Adaptec, Inc., Milpitas, CA (US)

( * ) Notice: Subject to any disclaimer, the term of this patent is extended or adjusted under 35 U.S.C. 154(b) by 402 days.

(21) Appl. No.: 11/080,305

(22) Filed: Mar. 15, 2005

(51) Int. Cl.
*G06F 12/00* (2006.01)
*G06F 17/30* (2006.01)

(52) U.S. Cl. .................... 707/200; 707/202

(58) Field of Classification Search ............ 707/1–3, 707/8–10, 100, 101, 200–203, 205, 206; 709/203, 213, 217, 219, 223; 711/114, 162, 711/170
See application file for complete search history.

(56) References Cited

U.S. PATENT DOCUMENTS

| | | | |
|---|---|---|---|
| 4,761,737 A | 8/1988 | Duvall et al. | |
| 5,638,498 A * | 6/1997 | Tyler et al. | 358/1.18 |
| 5,765,165 A * | 6/1998 | Harper | 707/200 |
| 5,905,990 A | 5/1999 | Inglett | |
| 5,991,542 A | 11/1999 | Han et al. | |
| 6,119,212 A | 9/2000 | Gross et al. | |
| 6,275,953 B1 * | 8/2001 | Vahalia et al. | 714/11 |
| 6,389,433 B1 * | 5/2002 | Bolosky et al. | 707/205 |
| 6,401,241 B1 | 6/2002 | Taylor | |
| 6,477,544 B1 * | 11/2002 | Bolosky et al. | 707/200 |
| 6,513,051 B1 * | 1/2003 | Bolosky et al. | 707/204 |
| 6,968,351 B2 * | 11/2005 | Butterworth | 707/206 |
| 7,171,469 B2 * | 1/2007 | Ackaouy et al. | 709/225 |

* cited by examiner

*Primary Examiner*—Jeffrey Gaffin
*Assistant Examiner*—Jacques Veillard
(74) *Attorney, Agent, or Firm*—Enrique J. Mora; Beusse, Wolter, Sanks, Mora & Maire, P.A.

(57) ABSTRACT

Method and computer program product for reducing storage space requirements in a computer file system comprising linkable files are provided. The method allows creating a list of each file eligible for storage reduction. The listed files are processed to determine files comprising duplicative content. At least one of the following is performed: a) determining a presence of an existent link pointing to files with duplicative content, or b) in the absence of an existent link, creating a link for coupling files with duplicative content. One may then eliminate storage space for any redundant duplicative content, thereby reducing storage size requirements for the file system.

14 Claims, 2 Drawing Sheets

METHOD AND COMPUTER PROGRAM FOR REDUCING STORAGE SPACE REQUIREMENTS IN A FILE SYSTEM COMPRISING LINKABLE FILES

COPYRIGHT NOTICE

A portion of the disclosure of this patent document comprises material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Information used by programmable computers, including data and executable programs, are typically stored on some form of memory device. Each type of known memory storage device presents the user with certain trade-offs regarding cost, speed of information retrieval, and capacity. For instance, electronic memory devices, such as random access memory (RAM), typically offer the user relatively fast data access. This high-speed data access, however, may fall short in connection with maximum storage capacity and cost considerations. Magnetic recording media, including tapes, diskettes, and magnetic hard drives, present the user with somewhat slower access times, but are relatively more cost effective than large electronic storage methodologies.

In order to transfer computer programs and data, many users, including software developers and purveyors, have traditionally shipped those programs and data on magnetic diskettes. These diskettes are typically inexpensive to procure, but have limited data storage capabilities. Large computer programs, for instance, which are shipped on magnetic media, typically require many diskettes to store an entire program or data set. The cost of recording many diskettes for each program sold is a cost factor that must be considered by a software developer or purveyor.

In order to alleviate the foregoing limitations of storage capacity per diskette, the use of compact disk (CD) or digital video data (DVD) technology has gained wide acceptance in the software industry. For example, where a single 3.5" magnetic floppy diskette is capable of holding typically a maximum of 1.44 Mbytes, a single CD can typically hold upwards of 600 Mbytes of information. The previously discussed trade offs still apply, however, in that while CD or DVD production is very cost effective and the devices themselves hold large amounts of data, the access time to that data is typically slower than that encountered on magnetic hard drives and relatively slower than data retrieval from electronic storage means.

One known practice to attempt alleviate the foregoing issues has been to use compression utilities to produce compressed software packages. The desired result is providing faster installation speed and smaller storage media. While the theoretical advantages of using compressed packages for an initial software installation may be apparent, in practice the compression techniques used in these software packages may be rather complicated, and the utility that installs the compressed software may require special tools that add cost and incremental delays in order to decode the compressed software to a baseline configuration. In some situations, the installation tools use a relatively rigid format and may lack the capability of dealing with the addition of new data compression regarding installation objects.

BRIEF DESCRIPTION OF THE DRAWINGS

The features and advantages of the present invention will become apparent from the following detailed description of the invention when read with the accompanying drawings in which:

FIG. 1 depicts interrelationships between exemplary data blocks, inode, and a directory that references a file.

DETAILED DESCRIPTION OF THE INVENTION

Computer-readable storage media, such as CDs, DVDs, floppy disks, and monolithic libraries, such as may comprise compressed or uncompressed archives, are all exemplary targets of storage and/or installation media that may benefit from techniques providing storage space optimization in accordance with aspects of the present invention.

Standard ISO9660 and UNIX file system are examples of file formats that utilize the concept of linking, e.g., hard links, a means for a directory entry to point to identical content. Given that standard ISO9660 provides a file format with read-only operability, hard linkages can be extensively taken advantage of without any potential deleterious side effects. It is believed that the techniques of the present invention are preferably suited for installation media or situations where the data is used as information archival rather than backup of directory statistics.

The description below describes known features of the UNIX operating system that may facilitate understanding some the basic underpinnings regarding aspects of the present invention. The UNIX operating system is utilized in an exemplary sense and not in a limiting sense since a large number of computer systems in the world run on the UNIX operating system. The UNIX operating system comprises a UNIX file system. There are three major parts to every file in the UNIX file system.

The first is the inode. Each file in the UNIX file system is described by a data structure called an inode. Inodes are located in special information blocks not used for data and each block typically comprises a plurality of inodes. Each inode generally comprises all information about a file except the file name and the actual data contained in the file. The disk addresses (indicative of physical locations on disk) for a file's information blocks are contained in the inode area. Inodes are numerically arranged to match the file system specifications that for example outline the maximum number of directory and file entities. This identifying number is known as the inode number or simply the i number. The inodes serve as pointers to the actual physical file blocks on disk containing the file data.

The second component of the UNIX file system comprises data blocks. Data blocks are located on disk and contain the actual data of a file. Each block can typically hold a data amount generally specified as a power of two and as a multiple of 512.

The third component of a UNIX file system is the directory. A directory contains one or more file names. Each entry in a directory contains one file name and the inode number that points to the inode for the file. Directories also have an inode.

Figure 1:
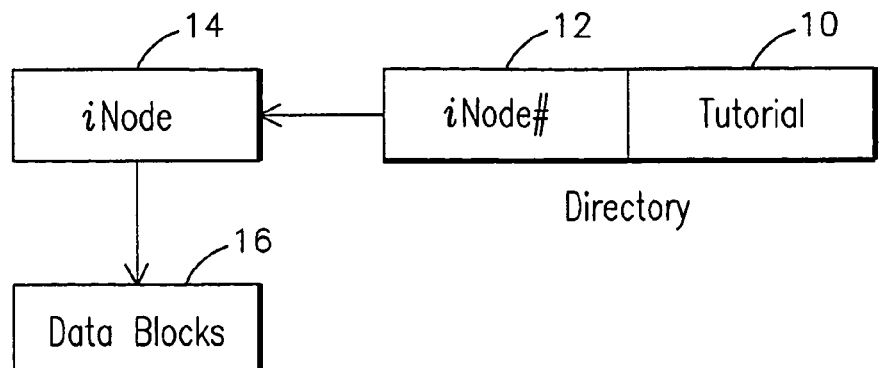
FIG. 1 illustrates an exemplary relationship in a file system, such as a UNIX file system, comprising linkable files and more specifically

FIG. 1 illustrates an exemplary relationship between the data blocks, the inode, and a directory that references the file. In FIG. 1, a file 10 named "tutorial" is associated with an inode number 12 pointing to inode 14 comprising information about the file "tutorial", such as when the file was created, when the file was last modified, type of file, etc. The inode 14 points to data blocks 16. The data blocks comprise the actual information for the file "tutorial", such as the data that comprises the file named "tutorial". It will be appreciated that the content of the data blocks need not be limited to data. For example, in the case of an archival application, the contents of a given file may in turn comprise a plurality of files.

A hard link may be viewed as a label or name assigned to a file. Traditionally, one may think of a file as comprising a set of information that has a unique name. However, it is possible to create a number of different names that all refer to the same contents. For example, commands executed upon any of these different names will operate upon the same file contents. A hard link provides a connection between a filename and inode number stored in a directory file. A user typically identifies files by filename while the kernel or operating system identifies files by their inode number. A hard link couples (or "links") these two ways of identifying a file.

Figure 2:
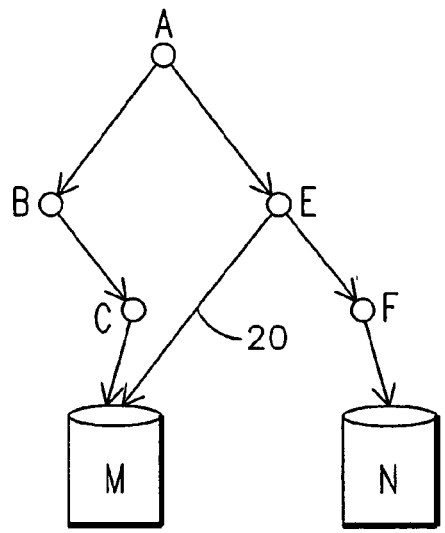
FIG. 2 illustrates an exemplary directory tree as may be processed to achieve storage space reduction in accordance with aspects of the present invention.

FIG. 2 illustrates an exemplary directory tree. In this example, path A/B/C/ points to a first file, e.g., file M. Similarly, path A/E/F points to a second file, e.g., file N. Assuming that the contents of file M and N are identical, by creating a hard link 20, one is able to reduce storage requirements since in this example the storage requirements for file N are no longer needed. The inventor of the present invention has innovatively recognized that the foregoing characteristic may be advantageously used to save storage space in a file system that comprises linkable files with relatively large amounts of duplicative identical content.

A publication zone, i.e., a zone that comprises each file eligible for linking, is processed to perform a search of duplicative content. More specifically, the processing may be configured to determine file size, and their respective inodes. In one exemplary embodiment, one may sort eligible files by file size and by inode. For example, all the files that have the same size are candidates for further comparison. That is, if any two files do not have the same size, no further comparison is needed since those two files cannot comprise identical content. However, if any two files have the same size, then further comparison is performed to determine whether such files actually comprise identical content. If a determination of files with identical content is established, one links those files and this action is conducive to reducing storage requirements since files with redundant duplicative content can be eliminated.

The processing of files in the publication zone is further configured to determine whether there is already hard linking present between any two or more files. In the event any such hard linking is already present, this would indicate the presence of duplicative content and once again this may be used for reducing storage requirements. For example, files with redundant duplicative content can be eliminated.

It will be appreciated that one may view an inode group as a single entity and one may then compare between inode groups. In general, an inode group may comprise just one individual file or may comprise multiple files. Accordingly, one may then compare inode groups for identifying duplicative identical content between such inode groups, and if there is a content match, i.e., the content is identical for any two or more inode groups, one would link such inode groups so that there is a new entity that encompasses a larger group of inodes.

Figure 3:
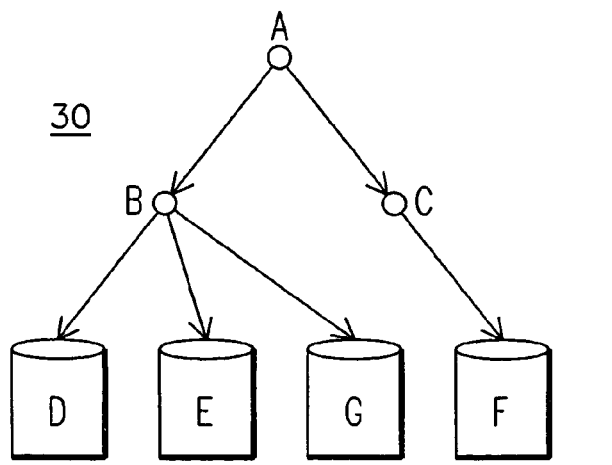
FIG. 3 illustrates another exemplary directory tree, which is used to illustrate further aspects of the present invention.

As shown in FIG. 3, let us say we have a directory tree 30 comprising a plurality of directory entries, such as entries A, B, and C pointing to files D, E, G and F. Possible paths may be A/B/D, A/B/E, A/B/G, and ACF. The processing of the files may be configured to determine file size and inode for each of the files in directory tree 30. Assume all the files D, E, F and G, have the same size, let us say five bytes, and further assume the respective inodes for files D, E, F and G are 10, 12, 32, and 12, respectively. The foregoing assumptions are summarized in Table 1 below and the storage (DU) requirements for this example would be 20 bytes.

TABLE 1

| Path | Size | inode | du |
| --- | --- | --- | --- |
| A/B/D | 5 | 10 | |
| A/B/E | 5 | 12 | |
| A/B/F | 5 | 32 | |
| A/C/G | 5 | 12 | |
| Total Storage | | | 20 |

As further illustrated in Table 2 below since files E and G have a common inode, such files are already linked and may be combined to form a single inode group. That is, files E and G have the same content and the storage requirements for one of them is not needed. Accordingly, the storage requirements (DU) have been reduced to 15 bytes by recognizing the existence of the link between files E and G.

TABLE 2

| Target Files | Size | inode | du |
| --- | --- | --- | --- |
| D | 5 | 10 | |
| (E, G) | 5 | 12 | |
| F | 5 | 32 | |
| Total Storage | | | 15 |

Since files E and G comprise an inode group one need not compare each individual file of the group against other files. Accordingly, one may just compare file D against file E in lieu of comparing file D against file E and then against file G. Assuming there is no match, one may then compare file E against file F. Table 3 below assumes that the comparison of files E and F establishes identical content in those two files.

TABLE 3

| Target Files | Size | inode | du |
| --- | --- | --- | --- |
| D | 5 | 10 | |
| (E, G) | 5 | 12 | |
| F | | 12 | |
| Total storage | | | 10 |

In this case a hard link is created between the inode group (E, G) and file F that points to the same identical content. For example, the created hard link may couple file F to the inode group (E, G). In this example, the storage requirements (DU) would be further reduced to 10 bytes since the storage requirements for file F is not needed. Thus, Tables 1-3 collectively comprise an example that illustrates reduction of storage requirements by recognizing files that are already hard linked (Table 2), and further illustrates recognizing files with identical content that may be linked to further reduce storage requirements.

Figure 4:
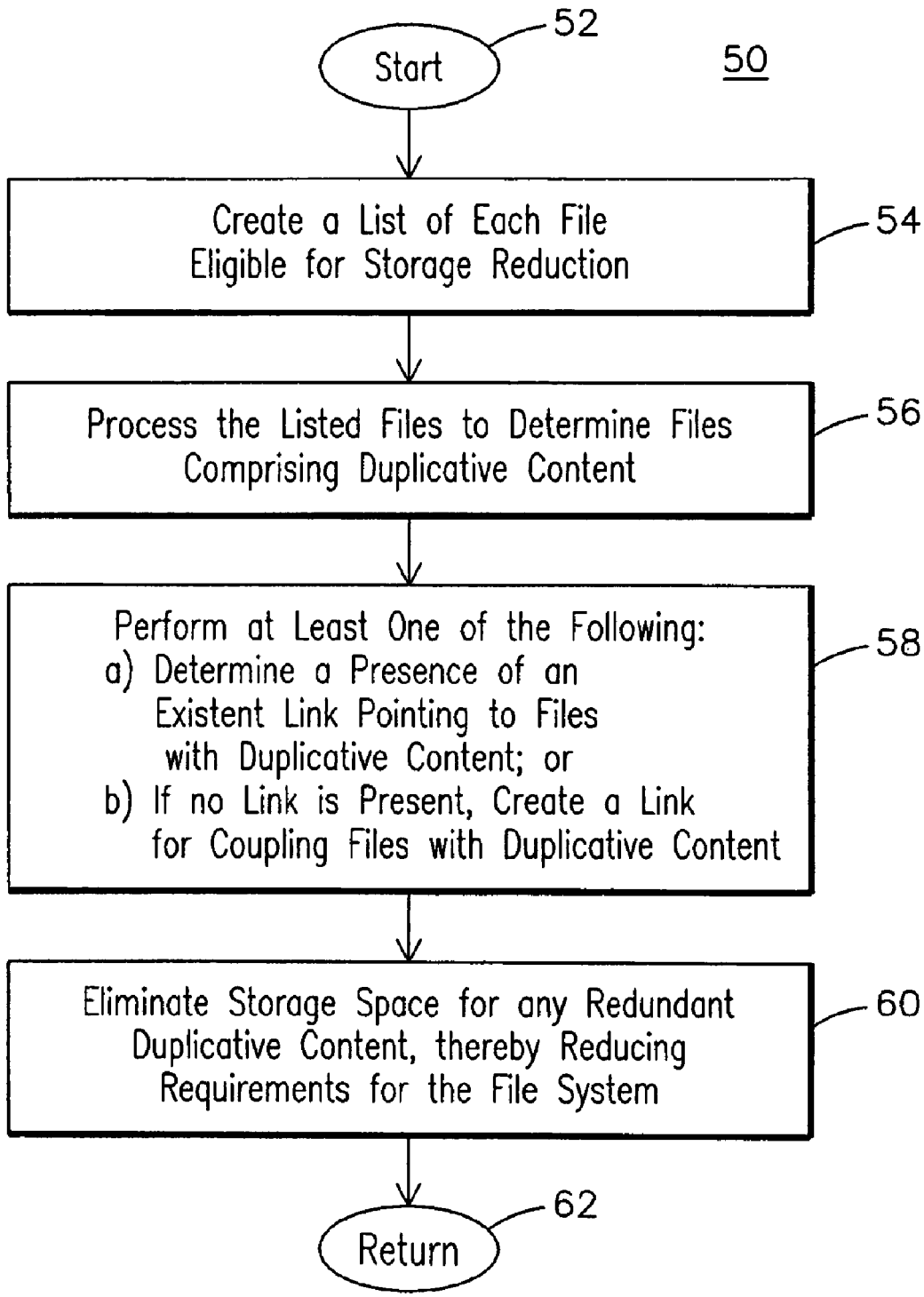
FIG. 4 is a flow chart of a method for reducing storage space requirements in a file system comprising linkable files in accordance with aspects of the present invention.

FIG. 4 is a flow chart 50 of a method for reducing storage space requirements in a file system comprising linkable files. Subsequent to start step 52, step 54 allows creating a list of each file eligible for storage reduction. For example, a publication zone may be used for listing each file eligible for storage reduction. Step 56 allows processing the listed files to determine files comprising duplicative content. Step 58 allows performing at least one of the following: a) determining a presence of an existent link pointing to files with duplicative content, or b) creating a link for coupling files with duplicative content. For example, in item a) an existent link may be determined by comparing inodes. If any two or more files share a common inode, this would indicate files having duplicative content. Alternatively, in item b), files having the same size may be compared to one another to determine whether such files have identical content. Files having different size negate the possibility of those files having identical content. Once files with identical content have been identified, such files may be hard linked to one another so that they point to the same identical content. Prior to return step 62, step 60 allows eliminating storage space for any redundant duplicative content, thereby reducing storage size requirements for the file system.

At this stage one may optionally run a disk utilization tool to confirm the reduced storage space so that the processed (or "consolidated") files may be stored in a storage device suitable for such a reduced storage space. In one exemplary embodiment, an image-generating tool, such as an mkisofs tool, may be run to generate an image of the consolidated files. By way of example, the image may be an iso9660 image. The generated image may then be burn into a suitable storage device, such as CD or DVD. Depending on the application, the image may be optionally copied into an archive or any other suitable installation media.

The foregoing storage-reduction techniques may be applied not just to data contents but may be extended to files comprising archive contents, compressed contents or both. One example of archive files may be tar archives. The acronym tar is derived from Tape ARchiver; however, one can use archives with any storage medium, such as DVDs, CDs, diskettes. By way of example, files archived with a Unix tar utility have the tar extension added to their names. If the files are both archived and compressed, the file extension is commonly designated as tar.Z. Another example of an archive application that may benefit from aspects of the present invention may be a cpio archive. An example of a file comprising compressed contents may be a file that contains one or more files compressed in the ZIP file format.

Aspects of the present invention can also be embodied as computer readable code on a computer readable medium. The computer readable medium may be any data storage device that can store data, which thereafter can be read by a computer system. Examples of computer readable medium include read-only memory, random-access memory, CD-ROMs, DVDS, magnetic tape, optical data storage devices. The computer readable medium may also be distributed over network coupled computer systems so that the computer readable code is stored and executed in a distributed fashion.

Based on the foregoing specification, aspects of the present invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to aspects of the invention. The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User interface may be provided by way of keyboard, mouse, pen, voice, touch screen, or any other means by which a human can interface with a computer, including through other programs such as application programs.

One skilled in the art of computer science will easily be able to combine the software created as described with appropriate general purpose or special purpose computer hardware to create a computer system or computer subsystem embodying aspects of the invention.

Appendix 1 is a copy of a computer program in script programming language of an exemplary implementation for optimizing storage space utilization in accordance with aspects of the present invention. It will be appreciated that the concepts of the present invention need not be implemented in any particular programming language, and accordingly the submission of Appendix 1 should not be construed in a limiting sense but just as an example of one possible implementation.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for reducing storage space requirements in a computer file system comprising linkable files, the method comprising:
   creating a list of each file eligible for storage reduction;
   processing the listed files to determine files comprising duplicative content;
   performing at least one of the following: a) determining a presence of an existent link pointing to files with duplicative content, and b) in the absence of an existent link, creating a link for coupling files with duplicative content;
   eliminating storage space for any redundant duplicative content, thereby reducing storage size requirements for said file system, wherein file content is selected from the group consisting of data files, archival files and compressed files.

2. The method of claim 1 wherein the processing of the listed files comprises determining respective file size and inode for each of the listed files.

3. The method of claim 2 further comprising performing a file content comparison for files having equal size, and, if the results of said content comparison indicate files comprising duplicative content, then hard linking said files with duplicative content.

4. The method of claim 2 further comprising grouping files sharing a common inode into a single inode group, thereby enabling comparing of said inode group relative to other eligible files.

5. The method of claim 1 further comprising generating an image without said redundant duplicative content.

6. The method of claim 5 further comprising transferring the image without said redundant duplicative content into a storage device, thereby affecting the size requirements of said storage device.

7. The method of claim 1 wherein the file system comprises read-only files selected from the group consisting of Unix and ISO9660 file systems.

8. A computer program product comprising a computer-readable medium having a computer-readable code therein for reducing storage space requirements in a computer file system comprising linkable files, the computer program product comprising:

computer-readable code for creating a list of each file eligible for storage reduction;

computer-readable code for processing the listed files to determine files comprising duplicative content;

computer-readable code for performing at least one of the following: a) determining a presence of an existent link pointing to files with duplicative content, and b) in the absence of an existent link, creating a link for coupling files with duplicative content; and computer-readable code for eliminating storage space for any redundant duplicative content, thereby reducing storage size requirements for said file system, wherein file content is selected from the group consisting of data files, archival files and compressed files.

9. The computer program product of claim 8 wherein the processing of the listed files comprises determining respective file size and inode for each of the listed files.

10. The computer program product of claim 9 further comprising performing a file content comparison for files having equal size, and, if the results of said content comparison indicate files comprising duplicative content, then hard linking said files with duplicative content.

11. The computer program product of claim 9 further comprising grouping files sharing a common inode into a single inode group, thereby enabling comparing of said inode group relative to other eligible files.

12. The computer program product of claim 8 further comprising generating an image without said redundant duplicative content.

13. The computer program product of claim 12 further comprising transferring the image without said redundant duplicative content into a storage device, thereby affecting the size requirements of said storage device.

14. The computer program product of claim 8 wherein the file system comprises read-only files selected from the group consisting of Unix and ISO9660 file systems.

\* \* \* \* \*